(12) United States Patent
Kim

(10) Patent No.: US 9,305,587 B2
(45) Date of Patent: Apr. 5, 2016

(54) OPTICAL DISC DEVICE

(71) Applicant: HITACHI-LG DATA STORAGE KOREA, INC., Seoul (KR)

(72) Inventor: Taesung Kim, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 0 days.

(21) Appl. No.: 14/799,257

(22) Filed: Jul. 14, 2015

(65) Prior Publication Data

US 2016/0019928 A1 Jan. 21, 2016

(30) Foreign Application Priority Data

Jul. 16, 2014 (KR) .................. 10-2014-0090043

(51) Int. Cl.
*G11B 17/056* (2006.01)
*G11B 17/03* (2006.01)

(52) U.S. Cl.
CPC .............. *G11B 17/03* (2013.01); *G11B 17/056* (2013.01)

(58) Field of Classification Search
CPC ................................................... G11B 17/056
USPC ........................................................ 720/610
See application file for complete search history.

(56) References Cited

U.S. PATENT DOCUMENTS

| 8,424,027 | B1 * | 4/2013 | Hsu | G11B 17/056 720/610 |
| 8,424,028 | B1 * | 4/2013 | Hsu | G11B 17/056 720/610 |
| 8,453,168 | B2 * | 5/2013 | Kim | G11B 17/056 720/610 |
| 8,479,224 | B2 * | 7/2013 | Kim | G11B 17/056 720/610 |
| 8,589,958 | B2 * | 11/2013 | Kim | G11B 17/056 720/610 |
| 2013/0283300 | A1 * | 10/2013 | Hsu | G11B 17/056 720/610 |

FOREIGN PATENT DOCUMENTS

JP EP 1365407 A1 * 11/2003 ........... G11B 5/5526

* cited by examiner

*Primary Examiner* — Will J Klimowicz
(74) *Attorney, Agent, or Firm* — Birch, Stewart, Kolasch & Birch, LLP

(57) ABSTRACT

An optical disc device includes an optical pickup and a transfer unit for linearly moving the optical pickup in a radial direction; and a locking module that is mounted on a rear side of the tray for unlocking the tray from the body, the locking module including a locking part having a hook for engaging a locking projection formed on the body and being mounted to be rotatable; a circular gear being mounted to be rotatable in connection with the transfer unit; a first connecting part for rotating by a linear force transmitted through the transfer unit moving outward; and a second connecting part for rotating by a force transmitted sequentially from the first connecting part and the circular gear and to transmit torque to the locking part to cause the hook to be unlocked from the locking projection.

12 Claims, 6 Drawing Sheets

OPTICAL DISC DEVICE

BACKGROUND

1. Field

The present invention relates to an optical disc device, and more particularly, to an optical disc device which allows a tray to be opened by the driving force of a step motor, without a solenoid.

2. Related Art

An optical disc device is a device that writes data on optical discs such as CDs, DVDs, and BDs or reads data from the optical discs to play them.

There are two types of optical disc devices: those in which a tray is slidably coupled to a body and a turntable and a pickup are mounted within the body; and those in which a tray is slidably coupled to a body and a turntable and a pickup are mounted on the tray. The former type is used for desktop PCs, and the latter type is used for laptops.

Optical disc devices for laptops have a locking means for locking the tray to keep it inserted in the body and an unlocking means for unlocking the tray to pull it out from the body. The locking means consists of a spring and a hook-shaped latching portion that engages a latching projection formed on the body, and the unlocking means uses a solenoid to rotate the latching portion and disengage it from the latching projection.

However, the use of a solenoid to disengage the latching portion for pulling out the tray involves additional costs, and the space needed for mounting the solenoid is limited.

SUMMARY

In view of this, an aspect of this invention is to provide an optical disc device which allows a tray to be unlocked without a solenoid.

One exemplary embodiment of the present invention provides an optical disc device comprising: a tray configured to hold an optical disc, be slidably pulled out from/inserted into the body of the optical disc, and comprise an optical pickup for writing or reading data to or from the optical disc and a transfer unit for linearly moving the optical pickup in a radial direction of the optical disc; and a locking module that is mounted on a rear side of the tray for unlocking the tray from the body, the locking module comprising: a locking part comprising a hook for engaging a locking projection formed on the body and being mounted to be rotatable; a circular gear being mounted to be rotatable in connection with the transfer unit; a first connecting part being mounted in such a way as to rotate by a linear force transmitted through the transfer unit moving outward; and a second connecting part being mounted in such a way as to rotate by a force transmitted sequentially from the first connecting part and the circular gear and to transmit torque to the locking part to cause the hook to be unlocked from the locking projection.

In one exemplary embodiment, the locking module may further comprise a first spring for providing elasticity to rotate the second connecting part in an opposite direction to that of rotation of the second connecting part by the force transmitted from the first connecting part.

In one exemplary embodiment, the locking module may further comprise a spring for providing elasticity to rotate the hook in a direction where the hook engages the locking projection.

In one exemplary embodiment, the first connecting part may comprise: a linear force receiving portion for receiving linear force through the transfer unit from a guide feed entering a predetermined outer circumferential region; and a first torque transmitting portion for transmitting force to the second connecting part by rotation.

In one exemplary embodiment, the second connecting part may comprise: a first torque receiving portion for receiving torque from the first connecting part; connecting teeth for meshing with the circular gear after rotating by the torque from the first connecting part; and a second torque transmitting portion for transmitting a torque transmitted from the circular gear through the connecting teeth to the locking part.

In one exemplary embodiment, the transfer unit may comprises: a lead screw; a motor for rotating the lead screw; and a guide feed for converting a torque of the lead screw to a linear force for moving the optical pickup by meshing with the lead screw, wherein the guide feed enters a second operating range, outside a data area for writing or reading data to or from an optical disc, by the rotation of the lead screw and transmits the linear force to the first connecting part.

In one exemplary embodiment, the lead screw may comprise a cutting region having no thread to mesh with the guide feed entering the second operating range.

In one exemplary embodiment, the optical disc device may further comprise a stopper that is provided outward than the cutting region and interferes with the guide feed to prevent the guide feed from moving outward any further.

In one exemplary embodiment, after the hook is unlocked from the locking projection by the rotation of the locking part, caused by the second connecting part, the motor may rotate the lead screw to move the guide feed inward, so that the circular gear meshing with the lead screw may rotate, causing the second connecting part to rotate and disengage the second connecting part from the circular gear.

In one exemplary embodiment, the guide feed may comprise: normal teeth for meshing with the lead screw when the optical pickup is in the data area; and dummy teeth located inward than the normal teeth, wherein, when the guide feed is in the second operating range, the normal teeth may be located in the cutting region, and the dummy teeth may mesh with the lead screw.

In one exemplary embodiment, when the lead screw rotates inward while the guide feed is in the second operating range, the guide feed may move inward by the dummy teeth meshing with the lead screw, and in turn the normal teeth located in the cutting region may come to mesh with the lead screw.

In one exemplary embodiment, the locking module may further comprise a spring for providing elasticity to rotate the first connecting part in an opposite direction to that of rotation of the first connecting part by the linear force transmitted from the guide feed.

Accordingly, it is possible to reduce the manufacturing cost of optical disc devices and simplify the configuration.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Figure 1:
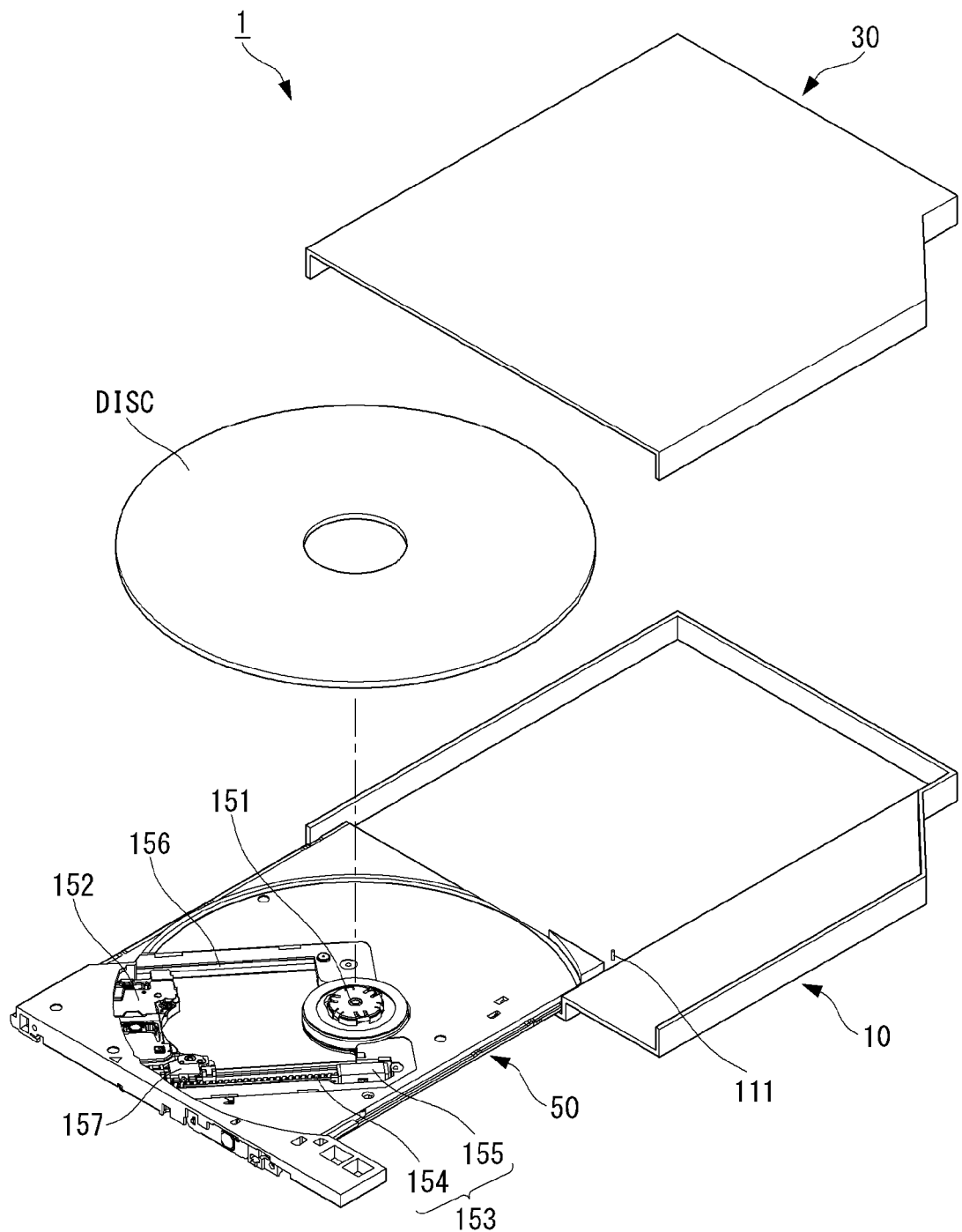
FIG. 1 is a perspective view showing a slim-type optical disc device, where a tray with a turntable and a pickup mounted on it is slid into a body.

The above characteristics, features, and advantages of the present invention will become apparent from the following detailed description, taken in conjunction with the accompanying drawings. As the present invention allows for various changes and numerous embodiments, particular embodiments will be illustrated in the drawings and described in detail in the written description. Like reference numerals refer to like elements throughout the specification. In the following description, detailed descriptions of well-known functions or configurations will be omitted where they may unnecessarily obscure the subject matters of the invention. Ordinal numbers (e.g., first, second, etc.) used in the description of the present disclosure are only for distinguishing one element from another element.

Hereinafter, an optical disc device related to the present invention will be described in more detail with reference to the drawings. The suffixes 'module' and 'unit' may be used for elements in order to facilitate the disclosure. Significant meanings or roles may not be given to the suffixes themselves and it is understood that the 'module' and 'unit' may be used together or interchangeably.

Figure 2:
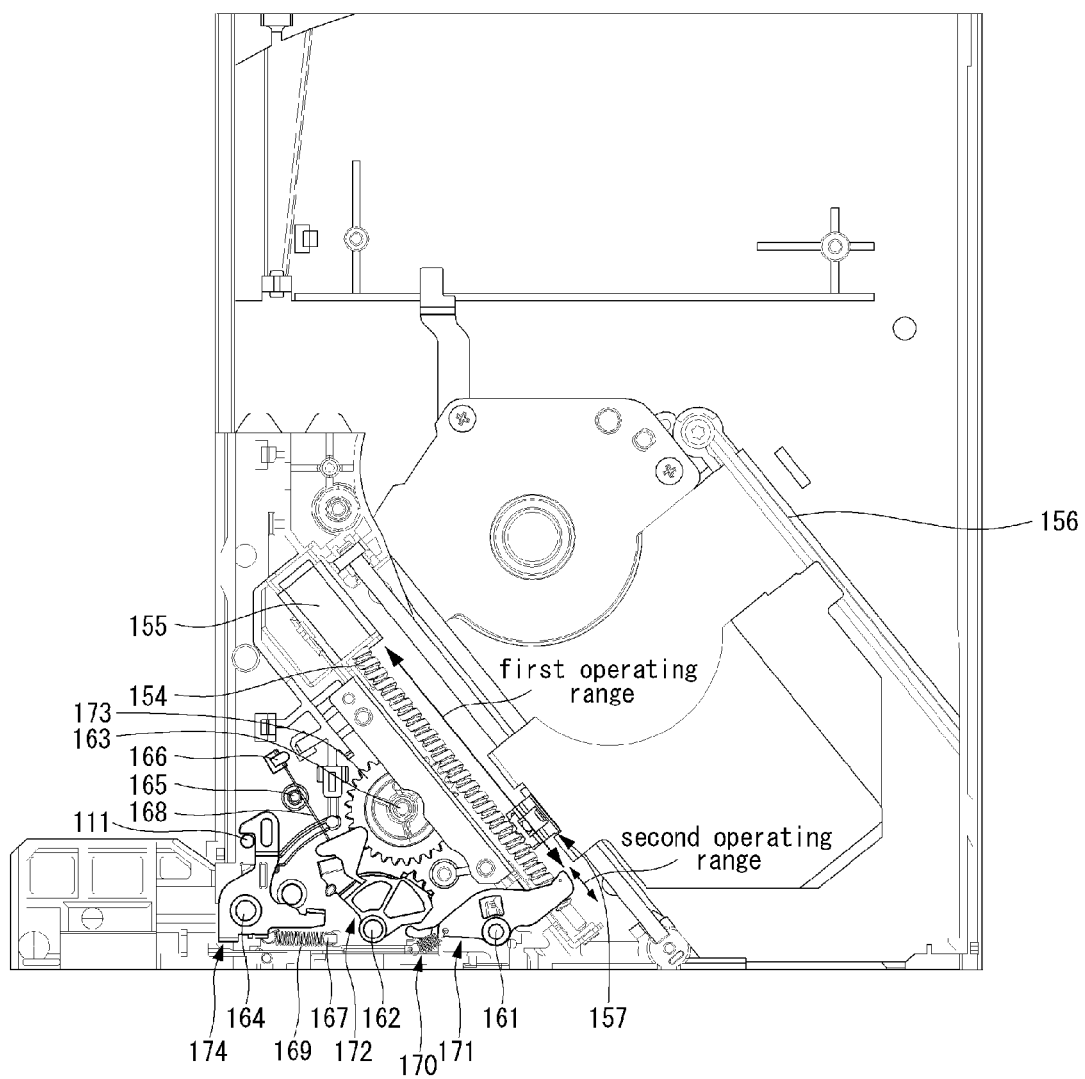
FIG. 2 is a view showing the rear side of the optical disc device of FIG. 1.

FIG. 1 is a perspective view showing a slim-type optical disc device, where a tray with a turntable and a pickup mounted on it is slid into a body. FIG. 2 is a view showing the rear side of the optical disc device of FIG. 1.

The optical disc device 1 comprises a main chassis 10 and a cover 30 which constitute the body, and the tray 50 for loading an optical disc is configured to be slid into the main chassis 10 so that the tray 50 can be inserted into the space between the main chassis 10 and the cover 30 and pulled out of the body.

The tray 50 comprises a spindle motor 151 for rotating an optical disc to be loaded on the tray 50, an optical pickup 152 for writing or reading data to or from the optical disc by shooting a laser beam on the optical disc, a pickup transfer unit 153 comprising a lead screw 154 for transferring the optical pickup 152 in a radial direction of the optical disc, a step motor 155 for rotating the lead screw 154 and a guide shaft 156 for guiding the transfer of the optical pickup 152, and a guide feed 157 for transmitting the lead screw 154's torque to the optical pickup 152 by meshing with the lead screw 154.

A locking module 70 is mounted on the rear side of the tray 50, in order to lock the tray 50 in the main chassis 10 while the tray 50 being inserted in the body of the optical disc device 1 or unlock the tray 50 to pull it out from the body. The locking module 70 may comprise a first connecting part 171, a second connecting part 172, a circular gear 173, and a locking part 174. The locking module 70 may unlock the tray 50 by the lead screw 154's torque.

Figure 3:
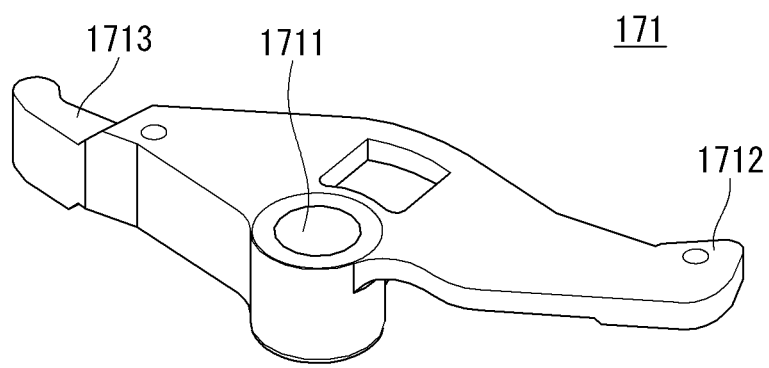
FIG. 3 is a perspective view showing a first connecting part of a locking module.

FIG. 3 is a perspective view showing the first connecting part 171 of the locking module.

The first connecting part 171 is a part that rotates by the linear force transmitted from the guide feed 157 when the guide feed 157 moves outward by the rotation of the lead screw 154. The first connecting part 171 may comprise a first through hole 1711 fitted to a first rotating shaft 161 on the rear side of the tray 50 to cause rotation, a linear force receiving portion 1712 that interferes with the guide feed 157 which moves to a predetermined outer circumferential region and receives linear force from the guide feed 157 linearly moving outward by the rotation of the lead screw 154, and a first torque transmitting portion 1713 for transmitting, to the second connecting part 172, a torque caused by the movement of the linear force receiving portion 1712 about the first rotating shaft 161.

The optical pickup 152 to which the guide feed 157 is connected is placed close to the spindle motor 151 relative to the lead screw 154, and the first connecting part 171 is placed far apart from the spindle motor 151 relative to the lead screw 154. The linear force receiving portion 1712 of the first connecting part 171 extends across the lead screw 154 without interfering with the lead screw 154, from the first rotating shaft 161 to a position where it can interfere with the guide feed 157 moving in a radial direction.

The second connecting part 172, circular gear 173, and locking part 174 are placed far apart from the spindle motor 151 relative to the lead screw 154.

Figure 4:
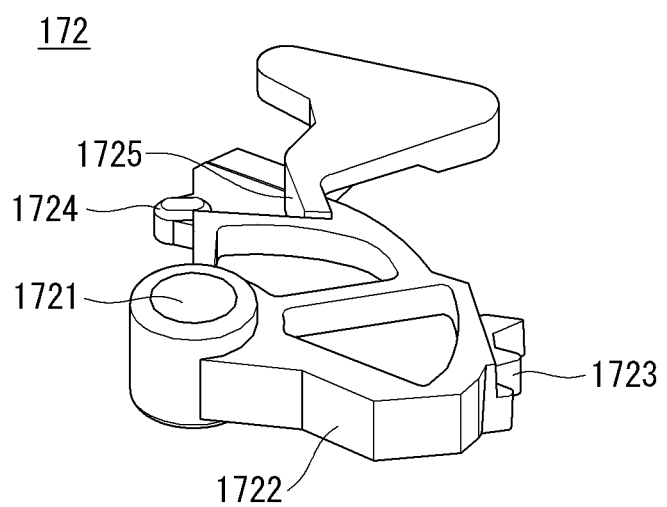
FIG. 4 is a perspective view showing a second connecting part of the locking module.

FIG. 4 is a perspective view showing the second connecting part 172 of the locking module.

The second connecting part 172 is a part that rotates by a force transmitted sequentially from the first connecting part 171 and the circular gear 173. The second connecting part 172 may rotate from the initial position by a torque transmitted from the first connecting part 171, and then receive more torque from the circular gear 173 and transmit it to the locking part 174.

The second connecting part 172 may comprise a second through hole 1721 fitted to a second rotating shaft 162 on the rear side of the tray 50 to cause rotation, a first torque receiving portion 1722 for receiving counterclockwise torque from the first torque transmitting portion 1713 of the first connecting part 171, connecting teeth 1723 for receiving the torque of the circular gear 173 by meshing with the circular gear 173, a second torque transmitting portion 1724 for transmitting the counterclockwise torque transmitted from the circular gear 173 through the connecting teeth 1723 to the locking part 174, and a second support part 1725 for the first spring 168 that supports one leg of the first spring 168.

The first spring 168 may be embodied in the form of a torsion spring. The main body of the first spring 168 is fitted to a rotating shaft 165 for the first spring 168 on the rear side of the tray 50, one leg of the first spring 168 is supported on a first support part 166 for the first spring 168 on the rear side of the tray 50, and the other leg is supported on the second support part 1725 for the first spring 168 that is displaced by a predetermined distance from the second rotating shaft 162 for the second connecting part 172. This pushes the second support part 1725 for the first spring 168 and hence provides a torque (clockwise) causing the second connecting part 172 to rotate about the second rotating shaft 162.

The circular gear 173 is a part that rotates in connection with the lead screw 154 and transmits the lead screw 154's torque to the second connecting part 172. The circular gear 173 may comprise a third through hole 1731 that is formed at the center so as to be fitted to the second rotating shaft 162 on the rear side of the tray 50 to cause rotation. As the teeth formed on the outer circumference mesh with the lead screw 154, the lead screw 154 rotates to cause the circular gear 173 to rotate about the second rotating shaft 162. Also, the teeth formed on the outer circumference may mesh with the connecting teeth 1723 depending on the rotational position of the second connecting part 172, thus transmitting torque to the second connecting part 172.

Figure 5:
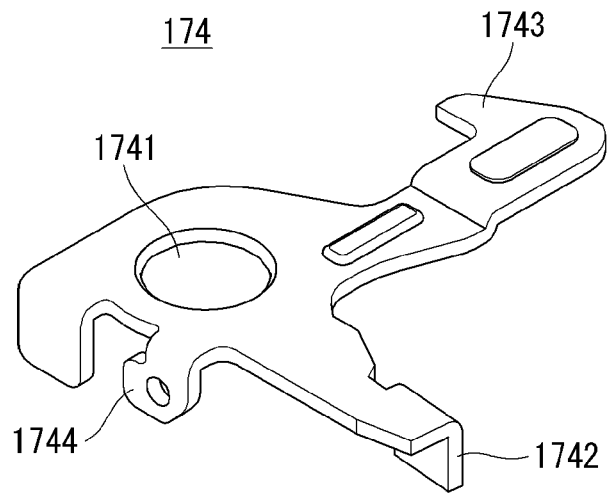
FIG. 5 is a perspective view showing a locking part of the locking module.

FIG. 5 is a perspective view showing the locking part 174 of the locking module.

The locking part 174 is a part where the tray 50 is locked to or unlocked from the main chassis 10. The locking part 174 may comprise a fourth through hole 1741 fitted to a fourth rotating shaft 164 on the rear side of the tray 150 to cause rotation, a hook 1743 that extends from the fourth through hole 1741 and engages a locking projection 111 protruding on the surface of the main chassis 10 to lock the tray 50, a second torque receiving portion 1742 for receiving the torque required to unlock the hook 1743 engaging the locking projection 111 by making contact with the second connecting part 172, and a second fixing portion 1744 for a second spring 169 that fixes one side of the second spring 169.

One side of the second spring 169 is fixed to the second fixing portion 1744 for the second spring 169 that is displaced by a predetermined distance from the fourth rotating shaft 164, and the other side is fixed to a first fixing portion 167 for the second spring 169 that is located on the rear side of the tray 50. This generates a torque for rotating the hook 1743, displaced by a predetermined distance from the fourth rotating shaft 164, in a direction (counterclockwise in FIG. 2) that allows the hook 1743 to engage the locking projection 111.

Figure 6:
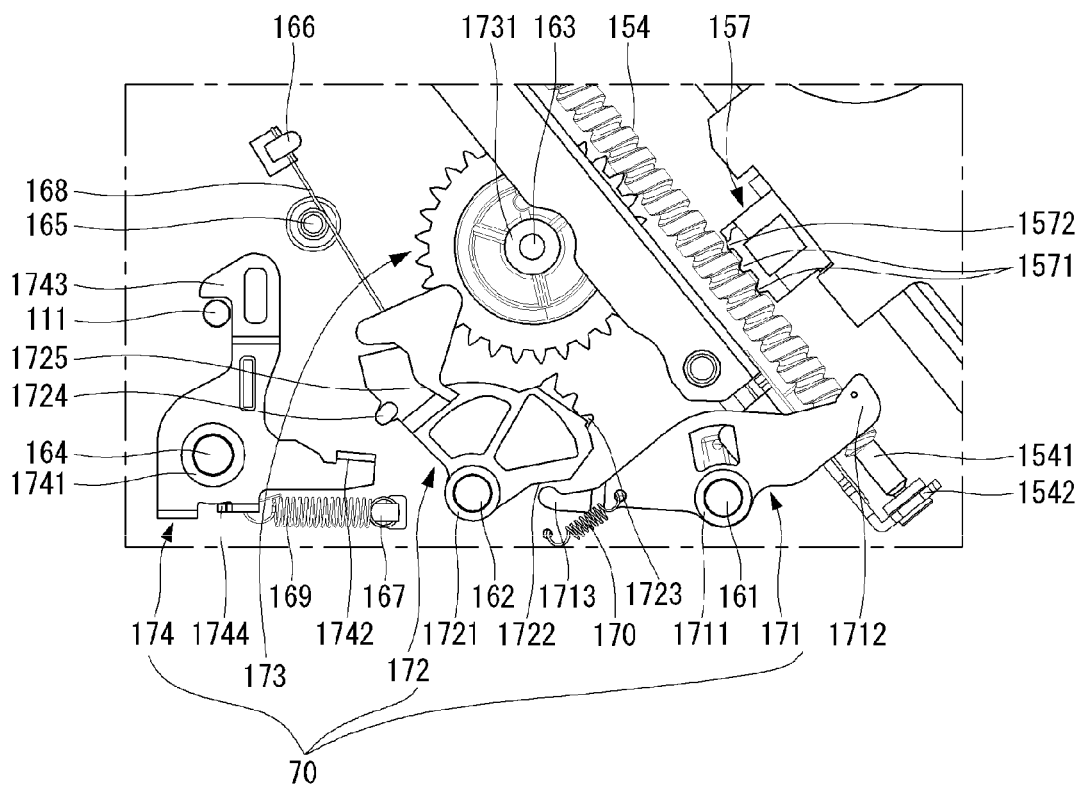
FIG. 6 is a view showing the elements of the locking module when the tray is in the locked position.
Figure 7:
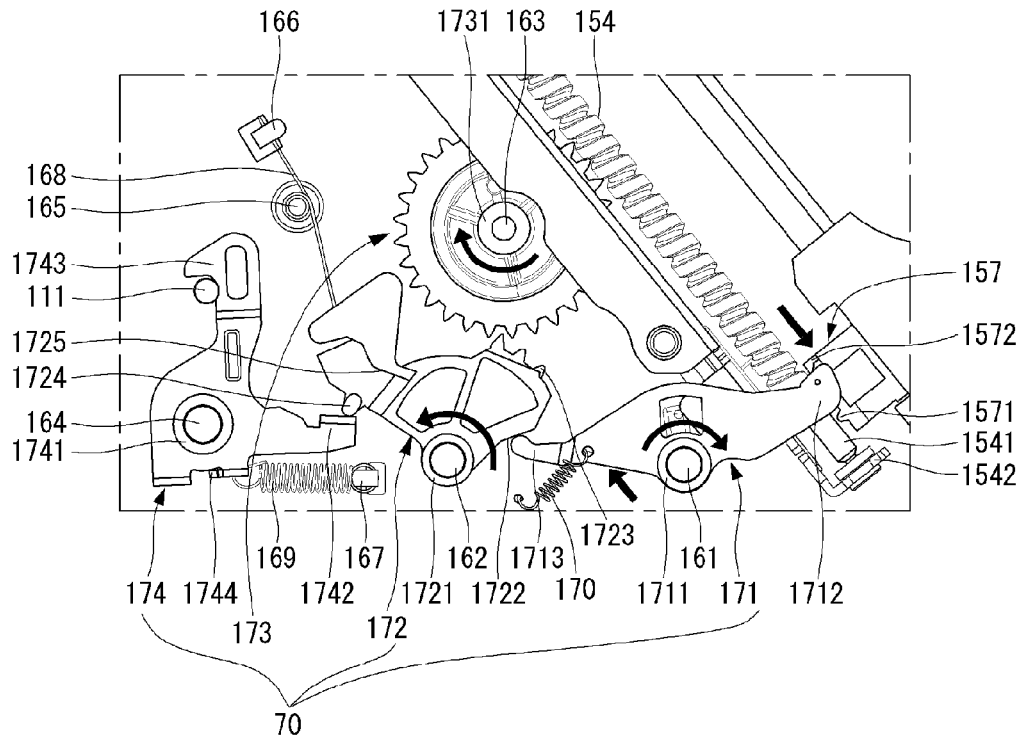
FIGS. 7 and 8 are views showing the elements of the locking module when the tray is unlocked.
Figure 8:
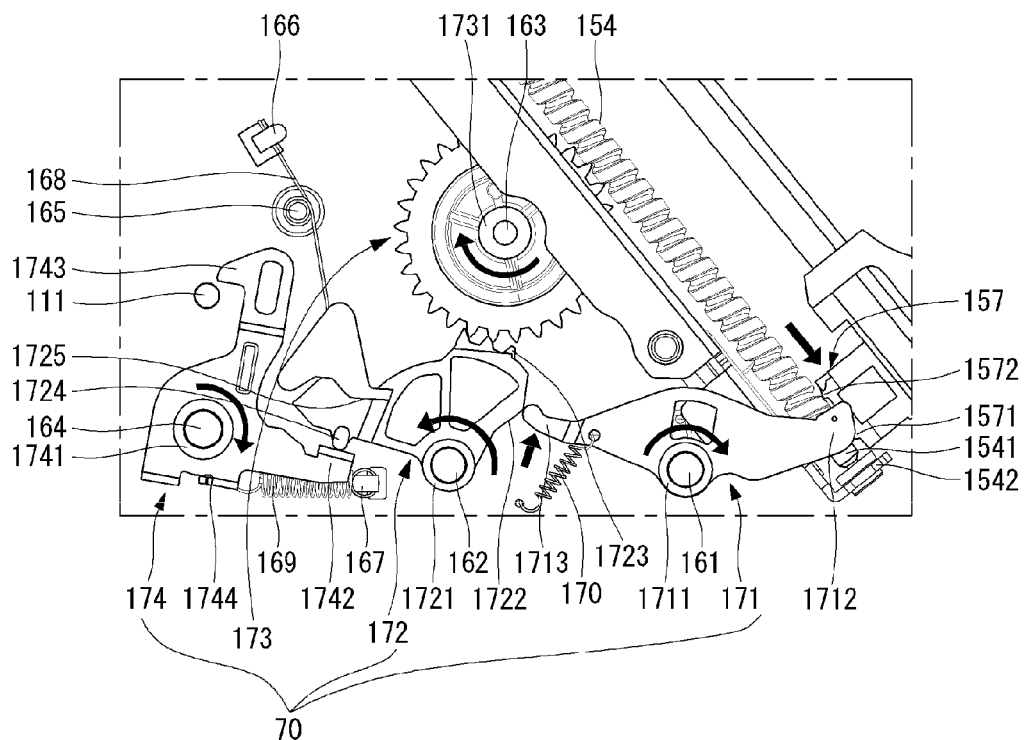
Figure 9:
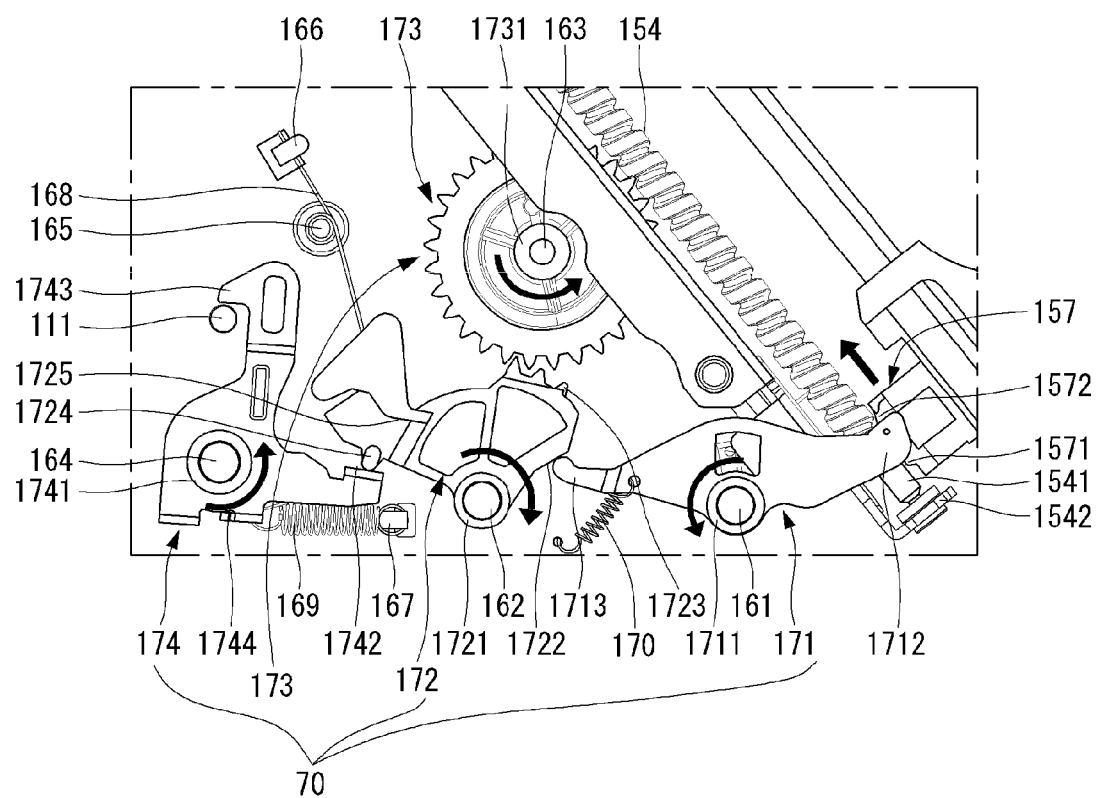
FIG. 9 is a view showing the locking module returning to the initial position.

FIGS. 6 to 9 are views for explaining the operation of the locking module: FIG. 6 is a view showing the elements of the locking module when the tray is in the locked position; FIGS. 7 and 8 are views showing the elements of the locking module when the tray is unlocked; and FIG. 9 is a view showing the locking module returning to the initial position.

Referring to FIGS. 6 to 9, the range of movement of the guide feed 157 by the lead screw 154 may be divided into a first operating range to which the guide feed 157 is moved to cause the optical pickup 152 to write or read data to or from a data area of an optical disc with a diameter of 12 cm and a second operating range outside the data area of the optical disc to which the optical pickup 152 is moved to allow the guide feed 157 to exert force on the linear force receiving portion 1712.

In FIG. 6, while the tray 50 is inserted in the body of the optical disc device 1, the locking part 174 rotates counterclockwise about the fourth rotating shaft 164 by an elasticity generated by the second spring 169, causing the hook 1743 to engage the locking projection 111.

While the tray 50 is moved far apart from the back side of the main chassis 10 by a force exerted by an eject shaft (not shown) and a spring (not shown), the tray 50 remains inserted in the body of the optical disc device 1 as the locking projection 111 protruding on the surface of the main chassis 10 and the hook 1743 of the locking part 174 are engaged together.

In this case, the second connecting part 172 also rotates clockwise about the second rotating shaft 162 by an elasticity generated by the first spring 168. Thus, the second torque transmitting portion 1724 is kept from exerting force to the second torque receiving portion 1742 of the locking part 174, and the connecting teeth 1723 are kept from meshing with the teeth on the outer circumference of the circular gear 173. Instead, the first torque receiving portion 1722 prepares to receive force from the first torque transmitting portion 1713 by interfering with the first torque transmitting portion 1713 of the first connecting part 171. Also, the guide feed 157 is located in the first operating range to write or read data to or from the data area of the optical disc, and therefore the linear force receiving portion 1712 of the first connecting part 171 does not interfere with the guide feed 157.

FIGS. 7 and 8 are views showing the elements of the locking module after a tray unlocking command is issued. When the guide feed 157 is moved from the first operating range to the second operating range by the rotation of the lead screw 154 powered by the step motor 155, the linear force receiving portion 1712 receives force by making contact with the guide feed 157, and the first connecting part 171 rotates clockwise about the first rotating shaft 161, thereby causing the first torque transmitting portion 1713 to rotate. Moreover, the first torque receiving portion 1722 being in contact with the first torque transmitting portion 1713 receives force from the first torque transmitting portion 1713, and the second connecting part 172 rotates counterclockwise about the second rotating shaft 162. Accordingly, the connecting teeth 1723 of the second connecting part 172 mesh with the teeth on the outer circumference of the circular gear 173.

In this case, the teeth of the guide feed 157 enter a cutting region 1541 on the end portion of the lead screw 154. Since screw is not formed in the cutting region 1541, the guide feed 157 and the lead screw 154 are not engaged and the rotational force of the lead screw 154 is not transmitted to the guide feed 157, thus keeping the guide feed 157 from linearly moving outward any further. Moreover, a stopper 1542 for interfering with the guide feed 157 may be provided outward than the cutting region 1541 to prevent the guide feed 157 from moving outward any further.

Afterwards, the step motor 155 is driven for ejection of the tray 50, and in turn the lead screw 154 rotates and the circular gear 173 working in connection with the lead screw 154 rotates clockwise about the third rotating shaft 163. Also, the second connecting part 172 with the connecting teeth 1723 meshing with the teeth on the outer circumference of the circular gear 173 rotates counterclockwise about the second rotating shaft 162 by the clockwise rotation of the circular gear 173. When the second connecting part 172 rotates counterclockwise by a force received from the circular gear 173, the first torque receiving portion 1722 and the first torque transmitting portion 1713 of the first connecting part 171 are separated without making contact with each other.

The second torque transmitting portion 1724 of the second connecting part 172 rotates counterclockwise by the torque of the circular gear 173 and transmits force to the second torque receiving portion 1742 of the locking part 174, and the locking part 174 rotates clockwise about the fourth rotating shaft 164 and disengages the hook 1743 and the locking projection 111 from each other, whereby the tray 50 is unlocked.

When the hook 1743 and the locking projection 111 are disengaged from each other, a force that moves the tray 50 further apart from the back side of the main chassis 10, causing the tray 50 from being partially ejected out of the body of the optical disc device 1.

The step motor 155 rotates the lead screw 154 by a predetermined angle such that the hook 1743 of the locking part 174 is disengaged from the locking projection 111.

FIG. 9 shows the locking module returning to the initial position.

After the tray 50 is ejected as the hook 1743 of the locking part 174 and the locking projection 111 are disengaged from each other, the optical disc device may drive the step motor 155 so that the lead screw 154 rotates in a direction for moving the guide feed 157 inward to return the locking module 70 to the initial position.

When the lead screw 154 rotates in a direction for moving the guide feed 157 inward, that is, the lead screw 154 rotates inward, the circular gear 173 meshing with the teeth of the lead screw 154 rotates counterclockwise about the third rotating shaft 163, the second connecting part 172 with its connecting gear meshing with the circular gear 173 rotates clockwise about the second rotating shaft 162, and the second torque transmitting portion 1724 rotates clockwise. At this point, the connecting teeth 1723 are disengaged from the teeth of the circular gear 173 by the clockwise rotation of the second connecting part 172.

As the second torque receiving portion 1742 receives no force from the second torque transmitting portion 1724, the locking part 174 rotates counterclockwise about the fourth rotating shaft 164, urged by the second spring 169, and returns to the initial position so that a next tray-locking operation can be performed. The initial position of the locking part 174 corresponds to a position where the sloping side of the hook 1743 may interfere with the locking projection 111 when the tray 50 is inserted into the body of the optical disc device 1.

Meanwhile, the first connecting part 171, separated from the second connecting part 172, receives no force from the second connecting part 172, and in turn exerts no force on the guide feed 157 located in the second operating range.

In addition to two normal teeth meshing with the lead screw 154, dummy teeth 1572 may be provided inward than the normal teeth 1571 so that the guide feed 157 located in the cutting region 1541 moves inward when the lead screw 154 rotates inward. When the guide feed 157 is in the second operating range during ejection of the tray 50, the normal teeth 1571 of the guide feed 157 are located in the cutting region 1541 of the lead screw 154 and the dummy teeth 1572 mesh with the lead screw 154.

When the lead screw 154 is rotated inward to return the hook 1743 to the initial position, the guide feed 157 moves inward by the dummy teeth 1572 meshing with the lead screw 154, thereby causing the normal teeth 1571 located in the cutting region 1541 to move to the first operating range and smoothly mesh with the lead screw 154.

A sharp edge may be formed at the boundary between the cutting region 1541 and screw-forming region in the lead screw 154. The normal teeth 1571 located in the cutting region 1541 may lock against this edge when moving to the first operating range. However, the torque of the lead screw 154 can be converted to linear force and transmitted to the dummy teeth 1572 while the dummy teeth 1572 are meshing with the lead screw 154. As such, when the guide feed 157 moves inward, the normal teeth 1571 located in the cutting region 1541 smoothly mesh with the lead screw 154 without locking against the edge formed at the boundary between the cutting region 1541 and screw-forming region of the lead screw 154.

For reference, it is preferable that the guide feed 157 is placed at the center of the optical pickup 152 in a radial direction, i.e., at a position corresponding to an object lens for focusing a laser beam from the optical pickup 152 on an optical disc, and the normal teeth 1571 may be centered on the guide feed 157 and the dummy teeth 1572 may be located inward than the normal teeth 1571.

The guide feed 157 may comprise a spring 170 for rotating the first connecting part 171 counterclockwise about the first rotating shaft 161, instead of the dummy teeth 1572. While the locking module 70 is performing an unlocking operation, the first connecting part 171 rotates the second connecting part 172 counterclockwise so that the connecting teeth 1723 mesh with the circular gear 173. Afterwards, the spring rotates the first connecting part 171 counterclockwise, and the linear force receiving portion 1712 of the first connecting part 171 transmits force to the guide feed 157, causing the guide feed 157 to move inward.

Alternatively, the angle of action of the elasticity of the first spring 168 for transmitting the force required to rotate the second connecting part 172 clockwise may be extended. This allows the second connecting part 172 to rotate clockwise by meshing with the circular gear 173, which is rotating counterclockwise by the inwardly-rotating lead screw 154, thereby disengaging the connecting teeth 1723 from the circular gear 173 and bringing the first torque receiving portion 1722 into contact with the first torque transmitting portion 1713 of the first connecting part 171. Even after that, the first spring 168 exerts elasticity on the second connecting part 172, and therefore the first torque receiving portion 1722 may transmit force to the first torque transmitting portion 1713 and in turn the first connecting part 171 may move the guide feed 157 located in the second operating range inward.

Consequently, the tray can be unlocked without a solenoid, by means of the step motor and lead screw for moving the optical pickup inward and outward.

Although the present invention has been shown and described with respect to specific exemplary embodiments, it will be obvious to those skilled in the art that the present invention may be variously modified and altered without departing from the spirit and scope of the invention. Accordingly, it is intended that all such modifications and alterations be included insofar as they come within the scope of the invention as claimed or the equivalents thereof.

What is claimed is:

1. An optical disc device comprising:
   a tray configured to hold an optical disc and be slidably pulled out from/inserted into a body of the optical disc device, the tray comprising an optical pickup for writing or reading data to or from the optical disc and a transfer unit for linearly moving the optical pickup in a radial direction of the optical disc; and
   a locking module that is mounted on a rear side of the tray for unlocking the tray from the body,
   the locking module comprising:
   a locking part comprising a hook for engaging a locking projection formed on the body and being mounted to be rotatable;
   a circular gear being mounted to be rotatable in connection with the transfer unit;
   a first connecting part being mounted in such a way as to rotate by a linear force transmitted through the transfer unit moving outward; and
   a second connecting part being mounted in such a way as to rotate by a force transmitted sequentially from the first connecting part and the circular gear and to transmit torque to the locking part to cause the hook to be unlocked from the locking projection.

2. The optical disc device of claim 1, wherein the locking module further comprises a first spring for providing elasticity to rotate the second connecting part in an opposite direction to that of rotation of the second connecting part by the force transmitted from the first connecting part.

3. The optical disc device of claim 1, wherein the locking module further comprises a spring for providing elasticity to rotate the hook in a direction where the hook engages the locking projection.

4. The optical disc device of claim 1, wherein the first connecting part comprises:
   a linear force receiving portion for receiving linear force through the transfer unit from a guide feed entering a predetermined outer circumferential region of the optical disc; and
   a first torque transmitting portion for transmitting force to the second connecting part by rotation.

5. The optical disc device of claim 1, wherein the second connecting part comprises:
- a first torque receiving portion for receiving torque from the first connecting part;
- connecting teeth for meshing with the circular gear after rotating by the torque from the first connecting part; and
- a second torque transmitting portion for transmitting a torque transmitted from the circular gear through the connecting teeth to the locking part.

6. The optical disc device of claim 1, wherein the transfer unit comprises:
- a lead screw;
- a motor for rotating the lead screw; and
- a guide feed for converting a torque of the lead screw to a linear force for moving the optical pickup by meshing with the lead screw,
- wherein the guide feed enters a second operating range, outside a data area for writing or reading data to or from an optical disc, by the rotation of the lead screw and transmits the linear force to the first connecting part.

7. The optical disc device of claim 6, wherein the lead screw comprises a cutting region having no thread to mesh with the guide feed entering the second operating range.

8. The optical disc device of claim 7, further comprising a stopper that is provided outward than the cutting region and interferes with the guide feed to prevent the guide feed from moving outward any further.

9. The optical disc device of claim 7, wherein, after the hook is unlocked from the locking projection by the rotation of the locking part, caused by the second connecting part, the motor rotates the lead screw to move the guide feed inward, so that the circular gear meshing with the lead screw rotates, causing the second connecting part to rotate and disengage the second connecting part from the circular gear.

10. The optical disc device of claim 7, wherein the guide feed comprises:
- normal teeth for meshing with the lead screw when the optical pickup is in the data area; and
- dummy teeth located inward than the normal teeth,
- wherein, when the guide feed is in the second operating range, the normal teeth are located in the cutting region, and the dummy teeth mesh with the lead screw.

11. The optical disc device of claim 10, wherein, when the lead screw rotates inward while the guide feed is in the second operating range, the guide feed moves inward by the dummy teeth meshing with the lead screw, and in turn the normal teeth located in the cutting region come to mesh with the lead screw.

12. The optical disc device of claim 7, wherein the locking module further comprises a spring for providing elasticity to rotate the first connecting part in an opposite direction to that of rotation of the first connecting part by the linear force transmitted from the guide feed.

* * * * *